Nov. 18, 1969    A. S. BERG    3,478,723
FEED DISTRIBUTING APPARATUS
Filed Aug. 30, 1967    3 Sheets-Sheet 1
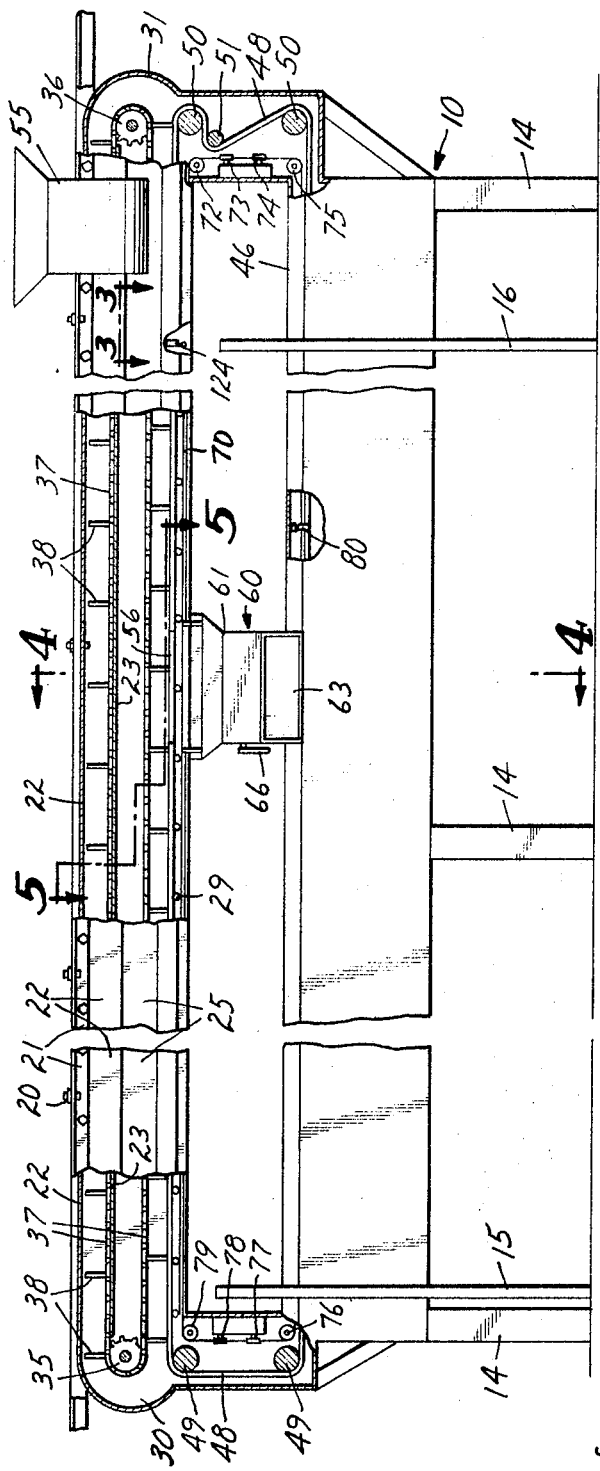
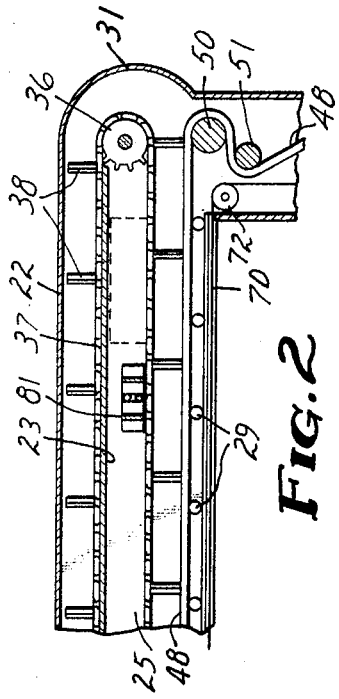
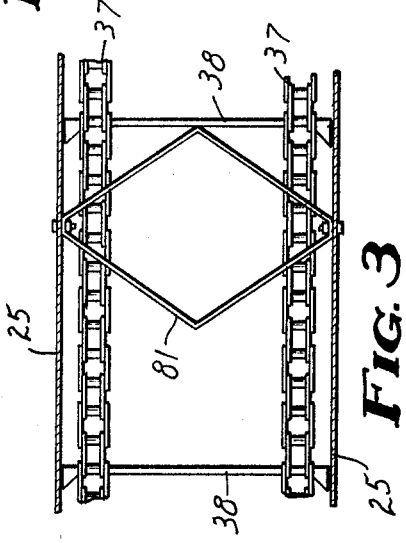
INVENTOR.
ALFRED SHELDON BERG
BY
Merchant & Gould
ATTORNEYS

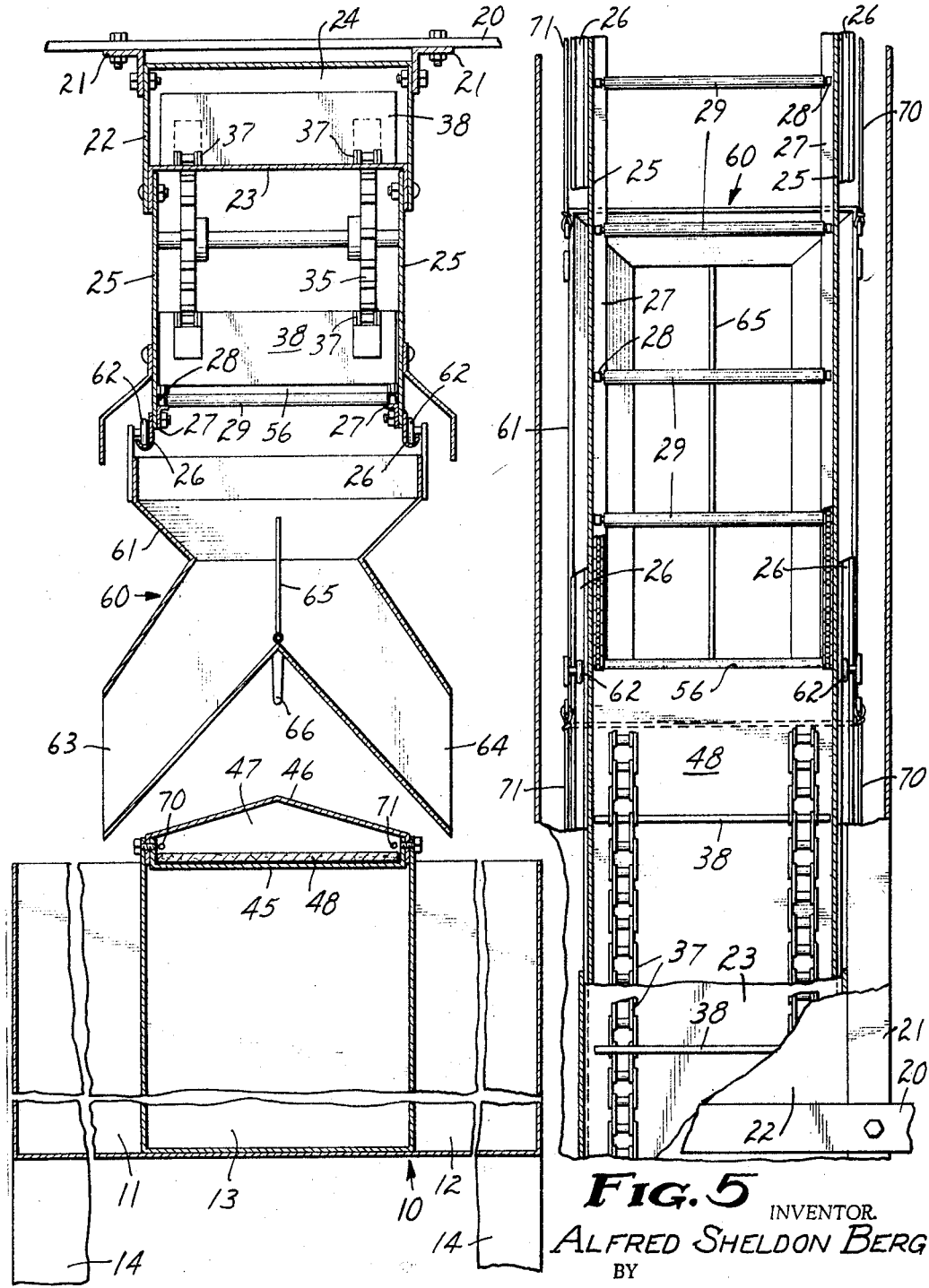

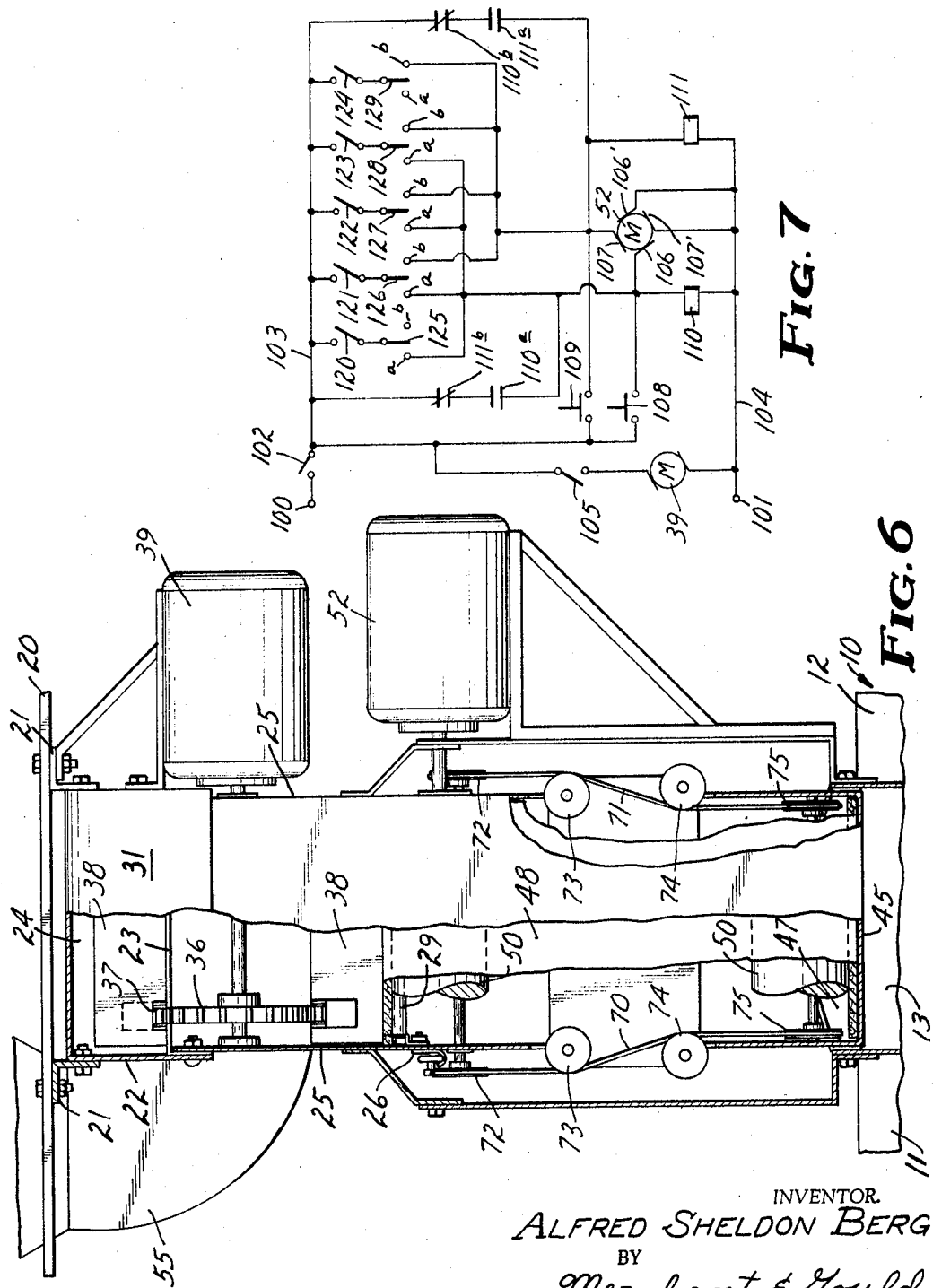

United States Patent Office 3,478,723
Patented Nov. 18, 1969

3,478,723
FEED DISTRIBUTING APPARATUS
Alfred Sheldon Berg, 508 W. Oakland Ave.,
Austin, Minn. 55912
Filed Aug. 30, 1967, Ser. No. 664,520
Int. Cl. A01k 5/00
U.S. Cl. 119—52    2 Claims

ABSTRACT OF THE DISCLOSURE

An endless chain having a plurality of flights extending outwardly therefrom mounted for rotary movement above a bunk feeder or the like. The lower portion of the chain is approximately horizontal and a generally flat belt is mounted approximately coextensive therewith and spaced the width of the flights therebelow. The belt has an opening therethrough with a feed chute mounted therebelow adapted to receive feed from the opening in the belt and direct it into the bunk feeder. A hopper empties feed onto the upper surface of the belt and a motor drives the chain continuously so that the flights move the feed toward the opening in the belt. The opening and feed chute are adjustable, by means of a motor and switches, longitudinally along the bunk feeder and/or in any desired increments thereof. Thus, the opening in the belt and the chute move periodically along the bunk feeder, or an increment thereof, and feed is moved through the opening into the chute by the chain and flights thereon.

BACKGROUND OF THE INVENTION

Field of the invention

In feeding livestock, bunk feeders or the like are utilized, which feeders are easily accessible from a plurality of pens generally situated along the length thereof and on either side. To feed the livestock the feed must be distributed along the portions of the feeder accessible to the pens having livestock therein, and the feed should be distributed generally uniformly along the feeder so that all of the livestock receive substantially equal amounts.

Description of the prior art

In the prior art, extremely complicated apparatus is utilized to distribute the feed along the length of a feeder. In general, these prior art devices utilize variable speed augers or variable speed belts having diverters in engagement therewith at predetermined intervals. These devices are generally extremely difficult to adjust and are subject to numerous other disadvantages, such as plugging and the like.

SUMMARY OF THE INVENTION

This invention pertains to a new and improved particulate material distributing apparatus and more specifically to distributing apparatus with a first endless conveyor means having a plurality of flights attached thereto, second endless conveyor means having a portion approximately parallel with a portion of said first conveyor means and spaced therefrom the distance of said flights, an opening through said second endless conveyor means and means for producing relative movement between said first and second conveyor means so that material introduced therebetween is moved toward said opening.

It is an object of the present invention to provide a new and improved particulate material distributing apparatus.

It is a further object of the present invention to provide a simplified and highly reliable feed distributing apparatus.

It is a further object of the present invention to provide feed distributing apparatus which is simple to operate.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures:

FIGURE 1 is a view in side elevation of the material distributing apparatus, parts thereof removed and shown in section;

FIGURE 2 is an enlarged axial sectional view of a portion of the right end of the apparatus illustrated in FIGURE 1;

FIGURE 3 is an enlarged view as seen from the line 3—3 in FIGURE 1;

FIGURE 4 is an enlarged sectional view as seen from the line 4—4 in FIGURE 1;

FIGURE 5 is an enlarged sectional view as seen from the broken line 5—5 in FIGURE 1;

FIGURE 6 is an enlarged end view as seen from the right end of the apparatus illustrated in FIGURE 1, parts thereof broken away and shown in section; and FIGURE 7 is a schematic diagram of the circuitry in the apparatus of FIGURE 1.

DESCRIPTION OF THE PREFERRED EMBODIMENT

Referring to the figures, the numeral 10 generally designates a feeder having elongated feeding compartments 11 and 12 extending the length thereof on either side of a blank or spacing compartment 13 located along the center of the feeder 10. The feeding compartments 11 and 12 and the spacing compartment 13 are spaced from the ground by a plurality of legs 14. In the use of the feeder 10, pens are constructed so as to extend outwardly from either side thereof. Each of the pens is in communication with a portion of one of the feeding compartments 11 or 12 so that livestock contained in the pen can reach the feed. As an example, outside posts 15 and 16 are illustrated to designate the outer limits of the pens. It should be understood that the apparatus illustrated in the figures could be of any desirable length and any number of pens could be formed therealong.

A plurality of transverse braces 20 are attached to the joists of a roof or the like directly over the feeder 10. Two angle irons 21 are secured to the braces 20 by bolts or the like so as to extend longitudinally along either side of and above the feeder 10. The angle irons 21 are connected so that the horizontal portion of each extends outwardly, and the vertical portions extend downwardly and approximately parallel. An inverted generally U-shaped housing member 22 is connected between the angle irons 21 by bolts or the like. A second inverted generally U-shaped member 23 is mounted within the U-shaped member 22 with the lower edges approximately even with the lower edges of the U-shaped member 22 and the horizontal portion spaced below the horizontal portion of the U-shaped member 22 to form an elongated opening 24 therebetween. Side panels 25 are attached to either downwardly extending inner surface of the U-shaped member 23, and form the remainder of the housing. Each of the side panels 25 has a track 26 mounted on the outer surface at the lower edge thereof. The tracks 26 are formed by turning a piece of metal outwardly in a generally hook-shaped cross section. Each of the side panels 25 further has an angle iron 27 mounted on the inner surface adjacent the lower edge thereof to form an inwardly projecting flange upon which a plurality of bearings 28 are fixedly mounted. The bearings 28 are mounted on the two angle irons 27 so as to form opposed pairs in which a plurality of rollers 29 are rotatably mounted.

The U-shaped member 22 extends somewhat past the ends of the U-shaped member 23 and the ends thereof are formed into generally semi-cylindrical portions 30 and 31. An idler sprocket 35 is mounted at approximately the axis of the semi-cylindrical portion 30 so that it is perpendicular to the longitudinal axis of the U-shaped member 22 and the horizontal portion of the U-shaped member 23 ends before it reaches the sprocket 35 and is approximately tangential with the upper surface thereof. In a similar fashion, a sprocket 36 is mounted at approximately the axis of the semi-cylindrical portion 31. A pair of endless chains 37 extend around the sprockets 35 and 36 in a spaced apart reltaionship and a plurality of outwardly projecting flights 38 are fixedly attached thereto. The flights 38 are approximately evenly spaced along the chains 37 and extend outwardly a distance slightly less than the radius of the semi-cylindrical portions 30 and 31 so that the chains 37 and the flights 38 rotate easily with the sprockets 35 and 36. The upper horizontal portion of the chains 37 rests on the upper surface of the horizontal portion of the U-shaped member 23 within the opening 24, while the lower horizontal portion of the chains 37 is spaced above the plurality of rollers 29 a distance slightly greater than the outwardly extending dimension of the flights 38. A motor 39 is fixedly attached at the outer surface of the U-shaped member 22 with the shaft thereof attached to the sprocket 36. Energization of the motor 39 produces rotation of the sprocket 36 and movement of the chains 37 and flights 38.

The upper end of the spacing compartment 13 in the feeder 10 has a generally U-shaped member 45 fixedly mounted therein with an inverted V-shaped member 46 attached thereover to form an opening 47 therebetween. A generally flat endless belt 48 extends through the opening 47 and over the rollers 29. A pair of vertically spaced apart rollers 49 rotatably mounted at the left end of the apparatus, as viewed in FIGURE 1, direct the belt 48 from the opening 47 upwardly over the rollers 29. In a similar fashion, a pair of rollers 50 at the right end of the apparatus direct the belt 48 from the opening 47 over the rollers 29. A third roller 51 at the right end of the apparatus serves as a tightening roller to insure that the belt 48 is taut during operation. The upper roller 50 at the right end of the apparatus has a motor 52 attached thereto for rotation and movement of the belt 48. The upper horizotnal portion of the belt 48 is sandwiched between the rollers 29 and the lower ends of the flights 38, and the lower ends of the flights 38 may actually engage the upper surface thereof.

A hopper 55 is fixedly attached to the outer surface of the U-shaped member 22 and the side panels 25, and is in communication with the opening between the side panels 25 so that feed placed in the hopper 55 drops between the flights 38 and onto the upper surface of the endless belt 48. The hopper 55 is located adjacent the right end of the apparatus, as illustrated in FIGURE 1, and energization of the motor 39 produces movement of the flight 38 relative to the belt 48 so as to move the feed longitudinally down the belt 48 toward the left end of the apparatus. The belt 48 is constructed with an opening 56 therethrough, and the feed, moved longitudinally along the belt 48 by the flights 38, drops through the opening 56 toward the feeder 10 thereunder. The opening 56 in the endless belt 48 may be constructed in a variety of ways, such as simply cutting the belt and spacing the ends apart with pieces of chain or the like.

Feed directing means generally designated 60 are mounted below the opening 56 in the belt 48 to receive the feed passing therethrough and direct it into a desired one of the feeding compartments 11 or 12. In the present embodiment the feed directing means 60 includes a housing 61 having an open upper end slightly larger than the area of the opening 56 in the belt 48, and a plurality of inwardly projecting wheels 62 engaged in the tracks 26 so that the housing 61 is movable therealong. The housing 61 projects downwardly and has an outlet 63 directly above the feeding compartment 11 and an outlet 64 directly above the feeding compartment 12. A centrally located flapper valve 65 directs the feed received in the housing 61 from the opening 56 into either of the outlets 63 or 64 by means of an external handle 66.

The housing 61 of the feed directing means 60 has one end of each of a pair of cables 70 and 71 attached thereto, which cables 70 and 71 extend toward the right of the apparatus, as viewed in FIGURE 1. The cable 70 is engaged over four pulleys 72 through 75, referring to FIGURES 1 and 6, which direct the cable 70 through the opening 47 to the left end of the apparatus where it is engaged over four more pulleys 76 through 79 and the opposite end is attached to the other side of the housing 61. In a similar fashion, the cable 71 is engaged over four pulleys, similar to pulleys 72 through 75, at the right of the apparatus, which direct the cable 71 through the opening 47, and four more pulleys, similar to pulleys 76 through 79, which engage the cable at the left end of the apparatus and direct the cable 71 toward the housing 61 where the opposite end is attached to the opposite side of the housing 61. The pulleys 72 through 79 and the pulleys similar thereto maintain the cables 70 and 71 taut and mount the cables 70 and 71 for easy movement. Each of the cables 70 and 71 are fixedly attached to the endless belt 48 within the opening 47 by a clamp 80. Thus, energization of the motor 52 and consequent movement of the endless belt 48 produces movement of the cables 70 and 71 and the feed directing means 60. The cables 70 and 71 are attached to the endless belt 48 so that the feed directing means 60 is always located directly below the opening 56.

A generally diamond-shaped blade 81 is mounted between the side panels 25 immediately above the lower horizontal portion of the chains 37. The blade 81 is stationary relative to the chains 37, and insures a level and substantially uniform amount of feed in front of each of the flights 38. It should be understood that the blade 81 could take on any of the variety of configurations or any other means might be utilized to insure a uniform distribution of feed on the belt 48.

Referring to FIGURE 7, a pair of terminals 100 and 101 are adapted to have a suitable source of electrical power supplied thereto, such as 110 volts 60 cycle. Terminal 100 has a manually operable switch 102 attached thereto in series with a line 103. Terminal 101 has a line 104 attached thereto. The motor 39 is connected in series with a manually operable switch 105 between the line 103 and the line 104. The motor 52 is a reversible motor having two pairs of brushes 106–106' and 107–107' therein. The brushes 106' and 107' are connected directly to the line 104. The brush 106 is connected through a reversing push-button switch 108 to the line 103. The brush 107 is connected through a forward push-button switch 109 to the line 103. A relay coil 110 is connected between the brush 106 and the line 104, and a second relay coil 111 is connected between the brush 107 and the line 104. A pair of normally open contacts 110a, associated with the relay coil 110, are connected in series with a pair of normally closed contacts 111b, associated with the relay coil 111, between the brush 106 and the line 103. A pair of normally open contacts 111a, associated with the relay coil 111, are connected in series with a pair of normally closed contacts 110b, associated with the relay coil 110, between the brush 107 and the line 103. Five normally open limit switches 120 through 124 are connected between the line 103 and the movable contacts of five single-pole double-throw switches 125 through 129. The two stationary contacts of each of the switches 125 through 129 are designated $a$ and $b$. The stationary contacts $a$ of the switches 125 through 128 are connected together and to the brush 106 of the motor 52. The stationary contacts $b$ of the switches 126 through 129 are connected together and to the brush 107 of the motor 52. The stationary contact *b* of the switch 125 and the stationary contact *a* of the switch 129 have no connections thereto.

To operate the apparatus, the switch 102 is closed manually and thereafter the switch 105 is closed. This provides electrical energy to the motor 39, which causes movement of the chains 37 and the flights 38. The various limit switches 120 through 124 are mounted at the ends of the pens, as for example, the limit switch 120 is mounted vertically above the post 15 and the limit switch 124 is mounted vertically above the post 16, as illustrated in FIGURE 1. All of the limit switches 120 through 124 are mounted so that the leading edge, determined by the particular direction of movement, of the feed directing means 60 engages and closes the switch. The motor 52 may be operated manually by depressing either the reverse push-button switch 108 or the forward push-button switch 109 which upon closing completes a circuit through the relay coil 110 or 111, respectively. Energizing the coils 110 or 111 completes a circuit through the contacts 111*b* and 110*a* to the brushes 106–106′ of the motor 52, or the contacts 110*b* and 111*a* to the brushes 107–107′ of the motor 52 respectively. Since the coils 110 and 111 are connected in parallel with the brushes 106 and 107, energization of either of the coils 110 or 111 causes the circuit to be locked in and the motor 52 continues to operate in that direction until the manual switch 102 is operated, or the opposite push-button switch 108 or 109 is operated.

If the operator wishes to automatically distribute feed in a particular pen, rather than throughout the feeder 10, he can simply close a certain combination of the single-pole double-throw switches 125 through 129, and the motor 52 will be automatically reversed at either end of the pen. For example, moving the movable contact of the switch 125 into engagement with the stationary contact *a* and the movable contact of the switch 129 into engagement with the stationary contact *b*, will cause automatic reversal of the motor 52 as the feed directing means 60 reaches the pole 15 and closes the limit switch 120 as well as when it reaches the pole 16 and closes the limit switch 124. In a similar fashion, if the operator wishes to distribute feed in a single pen at the left of the apparatus, the movable contact of the switch 125 is placed in engagement with the stationary contact *a*, while the movable contact of the switch 126 is placed in engagement with the stationary contact *b*. The motor 52 will then reverse each time the feed directing means 60 strikes one of the limit switches 120 or 121. Any other combination of the switches 125 through 129 can be made to cause automatic reversal of the motor 52 and oscillation of the feed directing means 60 over any desired portion of the feeder 10.

Thus, it can be seen that the present apparatus can be easily adjusted to distribute feed over any desired portion of the feeder and that the distribution will be accomplished accurately and reliably. Also, there is little or no danger of the material placed in the hopper 55 getting into the working parts of the apparatus and fouling or damaging them.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:
1. Feed distributing apparatus in combination with a bunk feeder comprising:
   (a) a frame fixedly mounted in juxtaposition to the bunk feeder and approximately coextensive therewith;
   (b) endless chain means rotatably mounted on said frame having a plurality of flights attached thereto for movement therewith and a generally horizontal portion approximately coextensive with the bunk feeder from which said flights extend generally downwardly;
   (c) conveyor belt means rotatably mounted on said frame having a portion with a generally flat upper surace approximately parallel and coextensive with the horizontal portionof said endless chain means and spaced therebelow approximately the distance said flights extend downwardly from said chain means;
   (d) motive means operatively attached to said endless chain means for continuous rotary movement thereof during operation of the apparatus;
   (e) hopper means for introducing feed onto the upper surface of said parallel portion of said belt means;
   (f) said belt means being further characterized by having an opening therethrough positioned in the parallel portion therefrom;
   (g) feed directing means mounted below the opening in said belt means for receiving feed passing therethrough and directing said feed in a desired direction;
   (h) second motive means operatively attached to said belt means and said feed directing means for movement thereof; and
   (i) adjustable means attached to said second motive means for energizing said motive means and periodically reversing the direction of movement thereof to periodically reverse the direction of movement of the opening in said belt means over predetermined and adjustable portions of the bunk feeder and provide a substantially uniform distribution of feed over the predetermined portion of the bunk feeder.

2. Feed distributing apparatus as set forth in claim 1 wherein the adjustable means includes a plurality of limit switches mounted in spaced apart relationship along the path of travel of the feed directing means and operable by means attached thereto, said limit switches being connected electrically in circuit with the second motive means in a desired mode of operation by a second plurality of switches for varying the periodic path of travel of the feed directing means.

References Cited

UNITED STATES PATENTS

| 446,436 | 2/1891 | Dodge | 198—68 |
| 2,589,690 | 3/1952 | Graetz | 198—62 |
| 3,311,219 | 3/1967 | Boehm | 198—110 |
| 3,378,132 | 4/1968 | Good | 198—135 |
| 3,108,571 | 10/1963 | Patz | 198—86 |

FOREIGN PATENTS 720,773  5/1942  Germany.

RICHARD E. AEGERTER, Primary Examiner

U.S. Cl. X.R.

198—68